June 25, 1963

E. F. KEON 3,095,162

RE-ENTRY BODY NOSE CONES

Filed Sept. 18, 1959

INVENTOR
EDWARD F. KEON

BY

ATTORNEY

United States Patent Office 3,095,162
Patented June 25, 1963

3,095,162
RE-ENTRY BODY NOSE CONES
Edward F. Keon, Lowell, Mass., assignor to Raytheon Company, Lexington, Mass., a corporation of Delaware
Filed Sept. 18, 1959, Ser. No. 840,887
4 Claims. (Cl. 244—1)

This invention pertains generally to nose cones for re-entry bodies and the like, and more particularly to an improved nose cone capable of withstanding extremely high temperatures and providing a high degree of thermal insulation for devices contained therein.

There are several examples in the prior art of nose cones which provide some measure of thermal insulation from the heat of re-entry for structural members and other devices mounted therein. Further, the prior art affords examples of structures which provide cooling for the nose cone so that it may withstand the extremely high heat encountered in high-speed flight through a gas such as the earth's atmosphere. This heat is particularly intense where a nose cone or similar body re-enters the earth's atmosphere after a flight into the surrounding space. Exemplary of such structures is the nose cone having an outer surface which undergoes ablation in the re-entry process in order to effect cooling thereof. While this and other structures often provide satisfactory operation, they also present disadvantages, such as the weakening of the mechanical strength as a result of the ablation.

As will be appreciated by those skilled in the art, it is desirable to provide re-entry body nose cones which will not only be able to withstand the high temperatures involved in "space" flight, but which will also provide a high degree of thermal insulation for devices and objects carried within the nose cone. Such devices may take the form of electrical or electromechanical control, measuring or recording devices which either assist in the control of, or measure data pertinent to, the flight of the nose cone and associated vehicle, or it may be that it is desired to provide thermal insulation for a mere mechanical structure, such as a strut or other support, such support not being fabricated of a suitable high-temperature material. In addition, it is sometimes desirable to carry an animate being within the nose cone, thus requiring even greater thermal insulation. Due to the generally small size of most nose cones, especially in relationship to the volume of the components and other objects to be carried therein, many of such objects are necessarily mounted or otherwise carried in close proximity to the material of the nose cone. It is therefore highly desirable to provide a nose cone of simplified construction which will be light in weight and small in size, and which will provide a high degree of thermal insulation for objects carried therein.

The problem of controlling the flow of heat, whether with respect to the prevention of heat flow (as in the art of thermal insulation) or with respect to the enhancement of heat flow (in order to dissipate heat readily from a hot-spot or the like), is an old one, and the solutions are numerous. The prior art affords many examples of heat-controlling members, some being characterized by rather low thermal conductivity so as to provide good thermal insulation between a heat source and an object which is to be protected therefrom, and others being characterized by relatively high thermal conductivity so as both to provide a ready avenue of heat dissipation for a heat source or hot-spot and to serve as a heat sink for the heat so conducted. The heat-controlling members of the prior art have generally fallen into either one or the other of these categories, being considered either a good thermal conductor or a good thermal insulator. For example, most high-temperature metals, such as tungsten, tantalum, molybdenum and the like, are good conductors of heat, and bodies of such materials readily serve as heat sinks and other heat dissipating means. A common example of a thermally insulating material is asbestos, which is available commercially in several forms. Another, and not so common, example of thermally insulating material is found in ablative plastics, which provide thermal insulation through the absorption of heat connected with the ablation of the plastic material.

In each of these materials of the prior art the thermal characteristics are substantially isotropic. In some instances, the difference between the thermal conductivities measured in mutually orthogonal directions is so small as to be practically unmeasurable, and even where the difference is measurable, the ratio of the two conductivities is on the order of only two-to-one, or even less. As a result of this lack of thermal anisotropy in the prior art materials, the heat-controlling members available in the past were either thermal insulators (as a result of their poor thermal conductivity) or dissipative heat sinks which absorb heat in conducting it away from a hot-spot or the like (due to their good thermal conductivity). Therefore, no heat-controlling bodies have been available which would both insulate against heat flow and, at the same time, provide a means for dissipating heat by the rapid conduction thereof away from the source. As is readily apparent, a tremendous advantage may be realized over the prior art by the use of a thermally anisotropic protective wall, or the like, between a heat source and a nearby object which is to be thermally insulated from such source. Where the antisotropic wall is positioned between the heat source and the protected object in the proper orientation, with its direction of poor thermal conductivity parallel with a line between the source and the object and its direction of high thermal conductivity perpendicular to such line, heat emanating from the source not only is prevented from reaching the protected object, but the heat is dissipated by conduction away from the local area. Stated in an alternative manner, where it is desirable to confine the flow of heat from a source so that it flows in a desired direction without being dissipated by undesired flow in other directions, a properly-oriented body exhibiting thermal anisotropy will conduct this heat readily in the desired direction and also prevent its escape in the other directions.

As will be appreciated by those skilled in the art, none of the substantially isotropic materials of the prior art provides a complete solution to the problems encountered with respect to the heat of re-entry. Where a good thermal insulator is employed, no dissipation of the heat is achieved, and where a good thermal conductor is utilized, no insulation is provided.

It is accordingly a primary object of the present invention to provide a re-entry body nose cone in which at least the outer surface of the cone exhibits a high degree of thermal anisotropy.

Another object of the invention is to provide a re-entry body nose cone which is constructed of a thermally anisotropic material.

An additional object of the invention is to provide a re-entry body nose cone in which the outer surface of the cone comprises a deposit of a thermally anisotropic material.

A further object of the invention is to provide, in combination, a thermally anisotropic re-entry body nose cone and a thermally labile object which is to be thermally protected thereby.

In accordance with the present invention, the above and other objects are achieved by means of a re-entry body nose cone at least the outer surface of which comprises pyrolytically-formed graphite. The pyrolytic graphite provides the desired thermal anisotropy, and the nose cone may comprise a body of this material or, alternatively, may comprise a suitable substrate having a deposit of pyrolytically-formed graphite thereon. While the pyrolytic deposition of graphite as a coating on a suitably inert substrate is not new, the present invention is the first disclosure of the use of pyrolytically-formed graphite in a re-entry body nose cone. In my copending application, Serial No. 835,618, filed August 24, 1959, and assigned to the assignee of the present invention, there is the first disclosure of the extreme thermal anisotropy of pyrolytically-formed graphite. The discovery of such thermal anisotropy is the culmination of long and arduous research directed toward the provision of vastly improved heat-controlling bodies, and the present invention is the utilization of this discovery in a new use as applied to nose cones in order to provide a new and unobvious result in this art.

In making use of the pronounced thermal anisotropy of pyrolytically-formed graphite, the present invention provides a first practical success in the control of heat flow in re-entry bodies in instances in which the requirements have been too extreme for the structures of the prior art to meet. For example, the extreme thermal anisotropy of the material of a nose cone in accordance with the present invention provides outstandingly superior insulation for nearby objects in comparison to the structures of the prior art, since the heat of re-entry existent at the outer surface of the nose cone is not only prevented from being conducted in the undesired direction, but is simultaneously dissipated by large thermal conduction in another direction. In achieving this new and unobvious result, the present invention utilizes concepts which have appeared disadvantageous to prior workers in the art.

Briefly, the present invention contemplates the provision of a heat-controlling and insulating nose cone, at least the outer surface of the cone comprising pyrolytically-formed graphite, with the thermal anisotropy of the latter providing the desired thermal characteristics. In the method of forming the nozzle of the present invention, a substantially conical substrate of a suitably inert material, such as ordinary graphite, is heated to a temperature at least equal to the decomposition or cracking temperature of the carbonaceous gas that is to be employed (e.g., 2100 degrees centigrade). The carbonaceous gas is then flowed over the heated substrate (or at least a portion thereof) for a time sufficient to form a coating or deposit thereon of a desired thickness, and the deposit is then cooled. Where it is desired to provide a nose cone comprising a free-standing body of pyrolytically-formed graphite, the substrate is then removed. Where, on the other hand, it is desired to provide a nose cone comprising a deposit of pyrolytically-formed graphite on a substrate (as, for example, to provide increased mechanical strength), the substrate is left in position and the nose cone constitutes the pyrolytic graphite layer and its supporting member.

With the above considerations and objects in mind, the invention itself will now be described in connection with a preferred embodiment thereof given by way of example and not of limitation, and with reference to the accompanying drawings, in which.

Figure 1:
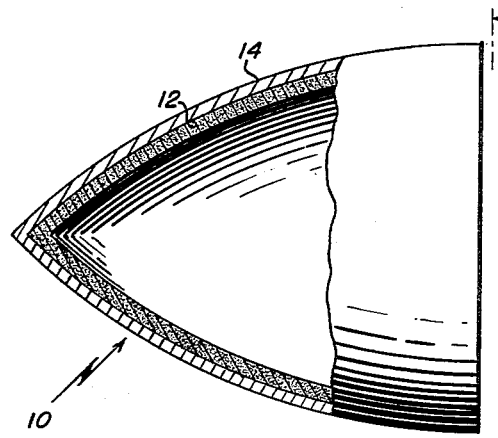
FIG. 1 is an elevation view in partial vertical section, showing a nose cone constructed in accordance with the present invention.

Referring now to FIG. 1, the numeral 10 indicates the nose cone in a general manner, such cone comprising a substrate 12 of ordinary graphite or the like, and a deposit 14 of pyrolytically-formed graphite thereon. The nose "cone" 10 is generally substantially conical in shape, with the particular taper of the periphery thereof depending upon the requirements of the application to which the body is to be put. In some instances a relatively sharp-nosed, thin body is desired, while in other cases it is more desirable to employ a rather short, blunt-nosed body. It will be understood that the particular shape of the re-entry body does not form an essential part of the present invention. With respect to the particular shape shown in the drawings herein, FIG. 2 provides an end view of the body of FIG. 1.

Figure 2:
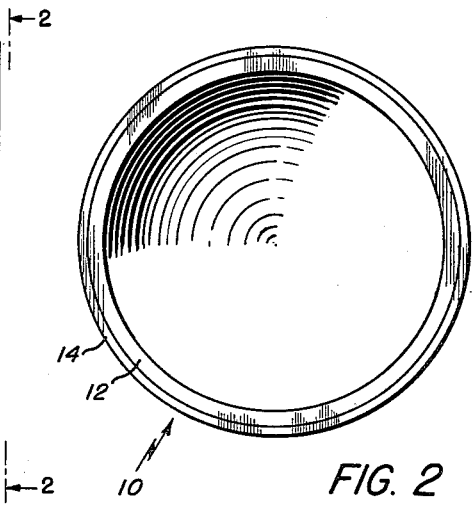
FIG. 2 is an end view of the nose cone of FIG. 1, taken on line 2—2 in that figure.

In the formation of the nose cone 10 of FIGS. 1 and 2, the substrate 12 is heated to at least the decomposition or cracking temperature of the particular carbonaceous gas that is to be employed in the pyrolytic deposition. Typical gases which may be employed for this purpose are methane, ethane, propane, benzene and carbon tetrachloride, all but the latter being hydrocarbon gases. As previously stated, a typical substrate material is ordinary graphite. With the substrate 12 at or above this critical temperature, a flow of the gas chosen is established along the external surface of the substrate so as to evenly, or almost so, expose such surface to the flow of the gas. Due to the pyrolysis of the gas when it comes into contact with the heated substrate, pyrolytic graphite is deposited on the hot outer surface thereof, forming the deposit or layer 14. The temperature is maintained and the gas flow continued until a deposit of sufficient thickness is achieved, and then the cone is cooled to complete the process.

Figure 3:
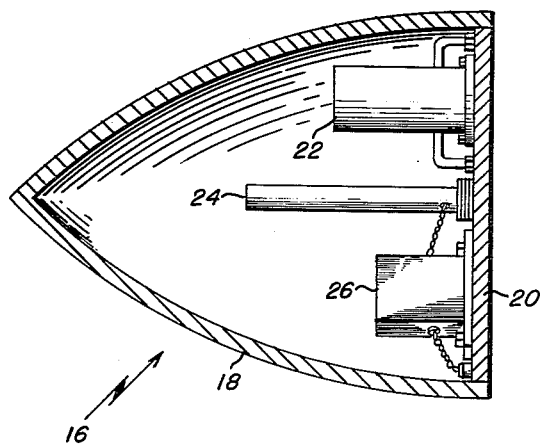
FIG. 3 is a vertical section of a preferred form of the nose cone of the present invention, shown in combination with devices adapted to be carried therein.

With reference now to FIG. 3 of the drawings, a slightly different nose cone 16 is shown, the difference lying mainly in the fact that the nose cone 16 is a self-supporting or free standing body of pyrolytic graphite, requiring no support member such as is shown in connection with the body of FIGS. 1 and 2. Nose cone 16 of FIG. 3 comprises a substantially conical member 18 of the particular taper or shape desired, and, as will generally be desired or even necessary, an end-cap 20 is provided, being secured to the nose cone proper in any suitable manner. By the definition provided by its name, the nose cone is adapted to be attached to some propelling engine or the like as the lead portion thereof, forming the nose of the vehicle so produced. As is common in the field of recoverable re-entry bodies, the instrumentation and other objects, whether animate or inanimate, which are to be recovered after a flight into space are mounted in or otherwise carried by the nose cone, which, in the final analysis, becomes the re-entry body proper.

As is generally the case, the body 16 will be of a size (relative to the size of the components contained therein) such that there is a necessity for mounting the several internal components thereof in rather close proximity to each other. Among other things, this usually requires the mounting of thermally labile components adjacent to the wall of the body 16. As is evident where objects may be mounted adjacent such wall (instead of being spaced therefrom in order to achieve thermal protection), a great advantage is afforded in the payload volume of the body 16. The thermally labile components referred to in this specification may be any of a wide variety of structures, devices or the like whose operation or structural integrity may be adversely affected by the extremely high temperatures of re-entry into the earth's atmosphere or the like. For example, the element which is to be thermally protected may be an electrical device or an electro-mechanical apparatus which performs a function in the control of the operation of the propelling engine, or, and what is a more likely role for such components, which serves to gather and record or transmit technical information concerning the flight of the vehicle. Further, the thermally labile device may merely be a structural member which is connected to the wall of the nose cone, as, for example, a strut or the like for the support of such wall. A somewhat more dramatic example of the nature of the thermally labile objects referred to herein is that of animate beings, such as rodents, lower primates, or, eventually, man. In FIG. 3, illustrative thermally labile devices which are to be protected from the heat of re-entry are the electromechanical device 22, the test probe 24 and the recording instrument 26. As will be understood by those skilled in the art, where it is necessary to energize one or more of these instruments with electrical energy or the like from within the missile or other vehicle to which the cone is attached as the nose piece, suitable connections therefore (not shown) may be effected through the end-cap 20. As is readily apparent, if these devices are not thermally insulated from the heat of re-entry, their operation will certainly be adversely affected, and they may actually lose their srtuctural integrity as a result of the application of the temperatures involved in re-entry. As to any animate life present within the re-entry body, death will normally be the result of the excessive temperatures involved. The thermal anisotropy of the pyrolytic graphite nose cone member 18 serves not only to prevent the conduction of heat inwardly through the cone, but also dissipates such heat along the surface thereof so as to provide even more effective insulation for the protected parts.

As previousily stated, many materials are characterized by a very small difference between their thermal conductivities in mutually orthogonal directions. In the materials of the prior art, the ratios of such thermal conductivities are quite small, being on the order of two-to-one or substantially less. In sharp contrast thereto, the material of the nose cone of the present invention is characterized by thermal anisotropies as great as five hundred-to-one. As will be understood by those skilled in the art, this large degree of anisotropy represents a tremendous stride forward in the techniques of heat-flow control, the difference between the characteristics of nose cones formed in accordance with the present invention and those of the prior art being a difference of kind or basic nature, rather than merely one of degree. The research efforts expended in the achievement of the discovery of the present invention disclose that at elevated temperatures pyrolytically-formed graphite is, in one plane, a better conductor of heat than any solid material previously known, and in a plane perpendicular to such first plane such material is substantially the poorest solid thermal conductor known. At room temperatures, to be more specific, pyrolytic graphite is a much better thermal conductor than even copper or silver, and while the thermal conductivity of pyrolytic graphite decreases gradually with increasing temperature, such conductivity is still a very high value and the pyrolytic graphite remains structurally intact at temperatures above the melting points of copper and silver. In the "C" direction, on the other hand, the thermal conductivity of pyrolytic graphite is lower than that of most solid insulators over a wide temperature range, and at extremely high temperatures it is even lower than that of fibrous thermal insulators. The two extremes of thermal conductivity are combined in a single body to present to the art for the first time a heat-controlling nose cone having such startlingly different characteristics. Concomitantly, the pyrolytic graphite nose cone of the present invention is substantially impervious to gases, thus providing obvious additional advantages.

As was also previously stated, the material of the nose cone of the present invention provides a thermally stabile structure even at the extremely high temperatures encountered. For example, nose cones fabricated in accordance with this invention have been subjected to an air-stabilized plasma jet of 10,000 degrees Fahrenheit for 30 seconds without noticeable structural deterioration. Another exemplary temperature-time measurement of the characteristics of this material is provided by the fact that such a nose cone was subjected to a rocket motor exhaust of 5700 degrees Fahrenheit for 65 seconds without noticeable structural deterioration. As will be understood by those skilled in the art, these temperature-time measurements are given merely by way of example, and the high-temperature characteristics of pyrolytic graphite should not be taken as fully defined by the data just given.

No complete and detailed explanation of the extreme thermal anisotropy of the material of the nose cone of the present invention will be made herein, since the behavior is not fully understood at present. However, the difference in the thermal conductivities is believed to be based upon the high degree of ordering of the elements of the crystalline lattice structure of the pyrolytically deposited graphite. The elements of such lattice structure are disposed in layers which are all parallel to the substrate surface upon which the pyrolytic graphite is deposited, the parallel layers lying in directions which define what is termed the A—B plane. The thermal conductivity in the A—B plane is extremely high, while the thermal conductivity in the perpendicular or thickness direction (the C direction) is very low. Obviously, the "planes" referred to herein are not necessarily planar, since where the deposition is made upon a non-planar surface the crystal "planes" or layers conform to the shape of the substrate surface.

It is important to note that the conditions under which the pyrolysis takes place must be carefully controlled in order to produce a body having good structural integrity. This is not to say that there is any one temperature, rate of gas flow, or other operating condition which must be adhered to in order to produce a satisfactory nose cone, since different temperatures, rates of gas flow, etc., as well as different combinations thereof, serve to produce different but satisfactory results for different requirements. What is important is that for a given set of operating conditions initially established, an effective control must be maintained thereover so as to prevent radical changes therein during the deposition. Typical faults that otherwise occur are surface blisters, internal bubbles and external "whiskers" or fragments. As a result of this need for control of the operating conditions, it is generally desirable to perform the deposition in a suitably closed container from which the air has been expelled prior to the introduction of the carbonaceous gas.

The invention has been described above in some detail, and particularly with reference to its application to the formation of a re-entry body nose cone. However, it will be obvious to those skilled in the art that the invention is equally applicable to re-entry bodies of other shapes. In addition, the thermally insulating nose cone of the present invention need not necesarily be employed in connection with bodies which re-enter the earth's (or some other) atmosphere, since the nose cone of this invention also applies to bodies which are required to travel through such an atmosphere (without necessarily leaving it) at excessive rates of speed where, due to the friction with the atmosphere, a temperature on the order of that of re-entry is encountered. Further, the thickness of the deposited graphite may be made to be non-uniform (in order, for example, to meet particular structural requirements) by selectively exposing areas of the substrate to different amounts of the carbonaceous gas, as by moving a spray of such gas along the deposit surface in a programmed manner. Hence, the invention is not to be considered as limited to the particular details given, nor to the specific application to which reference has been made during the description of the invention, except insofar as may be required by the scope of the appended claims.

What is claimed is:

1. An improved nose cone for re-entry bodies and the like, comprising a hollow member having a substantially conical outer surface, said hollow member constituting a body of pyrolytically-formed graphite characterized by respectively high and low degrees of heat conductivity in mutually orthogonal directions the A—B crystal structure plane of which is substantially parallel to said outer surface, said body oriented to provide high thermal conductivity along such surface and low thermal conductivity through the thickness of said member.

2. An improved nose cone for re-entry bodies and the like, comprising a hollow member having a substantially conical outer surface, said hollow member constituting a substantially conical hollow substrate and a deposit of pyrolytically-formed graphite on the outer surface thereof characterized by respectively high and low degrees of heat conductivity in mutually orthogonal directions, said deposit oriented to provide high thermal conductivity along such surface and low thermal conductivity through the thickness of said member.

3. In a re-entry body adapted to be recaptured after a flight into space, thermally labile indicating and recording means for providing data pertaining to such flight, and hollow nose cone means at least partially enclosing said indicating and recording means for protecting the latter from the heat of re-entry, said nose cone means having a substantially conical outer surface, and constituting a body of pyrolytically-formed graphite characterized by respectively high and low degrees of heat conductivity in mutually orthogonal directions the A—B crystal structure plane of which is substantially parallel to said outer surface, and oriented to provide high thermal conductivity along such surface and low thermal conductivity through the thickness of said body.

4. In a re-entry body adapted to be recaptured after a flight into space, thermally labile indicating and recording means for providing data pertaining to such flight, and hollow nose cone means at least partially enclosing said indicating and recording means for protecting the latter from the heat of re-entry, said nose cone means having a substantially conical outer surface, and constituting a substantially conical hollow substrate and a deposit of pyrolytically-formed graphite on the outer surface thereof characterized by respectively high and low degrees of heat conductivity in mutually orthogonal directions, and oriented to provide high thermal conductivity along such surface and low thermal conductivity through the thickness of said nose cone.

References Cited in the file of this patent

UNITED STATES PATENTS 2,922,722     Hutcheon _____ Jan. 26, 1960

OTHER REFERENCES

Aviation Week, April 21, 1958, vol. 68, No. 16, "Space Technology," pages 51, 53, 55, 57, 59.

Missiles and Rockets, vol. 3, No. 3, March 1958, "1958 Missile Materials Review," pages 69–75.

Missiles and Rockets, vol. 4, No. 2, July 14, 1958, "Glass Ceramics-New Vista for Radomes," pages 27, 28 and 30.

Progress in Nuclear Energy, Series IV, 1956, McGraw-Hill Book Co., New York, N.Y., "Technology and Engineering."